United States Patent
Nishio et al.

(10) Patent No.: US 7,435,145 B2
(45) Date of Patent: Oct. 14, 2008

(54) CONNECTION TERMINAL AND CONNECTION APPARATUS FOR ELECTRONIC COMPONENTS

(75) Inventors: Atsushi Nishio, Tama (JP); Shinichi Asano, Tama (JP)

(73) Assignee: Mitsumi Electric Co., Ltd., Tama-shi, Tokyo (JP)

( * ) Notice: Subject to any disclaimer, the term of this patent is extended or adjusted under 35 U.S.C. 154(b) by 0 days.

(21) Appl. No.: 11/605,274

(22) Filed: Nov. 29, 2006

(65) Prior Publication Data

US 2007/0122090 A1    May 31, 2007

(30) Foreign Application Priority Data

Nov. 30, 2005 (JP) .............................. 2005-347123

(51) Int. Cl.
*H01R 4/48* (2006.01)
(52) U.S. Cl. ......................................... 439/862; 439/71
(58) Field of Classification Search ................. 439/862, 439/71
See application file for complete search history.

(56) References Cited

U.S. PATENT DOCUMENTS

| | | | | |
|---|---|---|---|---|
| 6,478,600 | B1 * | 11/2002 | Wang et al. | 439/342 |
| 6,994,566 | B2 * | 2/2006 | You | 439/66 |
| 7,264,486 | B2 * | 9/2007 | Ma | 439/83 |
| 2003/0228809 | A1 * | 12/2003 | Howell et al. | 439/862 |
| 2005/0042940 | A1 * | 2/2005 | Liao | 439/862 |
| 2005/0181683 | A1 * | 8/2005 | Miyamoto | 439/862 |

FOREIGN PATENT DOCUMENTS

JP        2005-073166         3/2005

* cited by examiner

*Primary Examiner*—Gary F. Paumen
(74) *Attorney, Agent, or Firm*—The Nath Law Group; Jerald L. Meyer; Stanley N. Protigal (57) ABSTRACT

A connection terminal that can be brought into stable one-point contact with an electrode and that allows for a smooth connecting operation, even in the case of small contact pads or other such electrodes for establishing electrical contact. A socket contact as the connection terminal is provided to an electronic-component connector having an open portion into which a module is inserted. The socket contact comes into contact at the distal end with an electrode of the module in a direction that intersects with the connecting direction of the module when the module is inserted. The socket contact has a contact part having a contact trunk that protrudes into the opening from the proximal-end side, and a contact point provided to the distal end of the contact trunk. The concave electrode of the module slides from the proximal-end side of the contact part to the distal-end side, and the contact part narrows towards the front surface.

19 Claims, 7 Drawing Sheets

CONNECTION TERMINAL AND CONNECTION APPARATUS FOR ELECTRONIC COMPONENTS

CROSS REFERENCE TO RELATED APPLICATIONS

The disclosure of Japanese Patent Application No. 2005-347123, filed on Nov. 30, 2005 including the specification, drawings and abstract is incorporated herein by reference in its entirely.

BACKGROUND OF THE INVENTION

1. Field of the Invention

The present invention, relates to a connection terminal that is electrically connected to electrodes of electric components such as an IC chip and IC module, and to a connection apparatus for electronic components.

2. Description of the Related Art

Conventionally, as a connection terminal that is electrically connected to electrodes provided on the side surface of electric components such as an IC chip and IC module, there is, for example, a terminal provided by a connector disclosed in Japanese Patent Application Laid-open No. 2005-73166.

The connection terminal on the connector side described in this Patent Document 1 is provided on the internal surface forming a hollow into which a camera module is inserted from above, and comes into contact with an electrode of the camera module when the camera module is inserted to the hollow.

This connection terminal is made up of a dielectric plate member such as metal that is bent into a reverse U shape. One side forming the reverse U shape is fixed to the internal surface of the connector, and the other side, which serves as a contact, extends from the inner peripheral surface of the connector into the hollow, so as to protrude on a slant toward the bottom surface of the hollow. This other side has a rectangular shape in a plan view, and is pushed to the inner peripheral surface side to be fixed to when the camera module is inserted into the hollow from above. This other side is pressed against the electrode by a drag.

An electrode provided to electronic components such as an IC chip and IC module is miniaturized, and its width becomes small.

In view of this, in order to reduce contact resistance to the electrode with a small width, it is hoped that a connection terminal has a structure of gathering the contact portions into one point.

However, when the conventional connection terminal described above is made to contact at one point with a small electrode, there is strength-related limitation in reducing the width of the contact itself, which protrudes from the inner peripheral surface. Therefore, there is a problem that it is difficult to achieve a point-contact structure by forming a convex shape to the contact surface side by forming ribs on the surface of the contact that comes into contact with the electrode or bending the contact along the axis.

SUMMARY OF THE INVENTION

It is therefore an object of the present invention to allow stable one-point contact to be formed with an electrode at a contact position, and to ensure that the connecting operation is performed smoothly, even in the case of a small electrode such as a contact pad in the connected component.

The above-described object is achieved with the present invention by providing a connection terminal provided to a connection apparatus connected to an electronic component, and that comes into contact at the distal end with an electrode of the electronic component in a direction that intersects with the connecting direction of the electronic component, the connection terminal having a contact part that is formed into a belt shape, wherein the electronic component slides from the proximal end to the distal end, and the electrode is brought into pressure contact at a contact point at the distal end when the electronic component is connected to the connection apparatus, wherein the contact part narrows towards the distal end.

DESCRIPTION OF THE PREFERRED EMBODIMENT

Embodiments of the present invention will be described in detail below with reference to the accompanying drawings.

Figure 1:
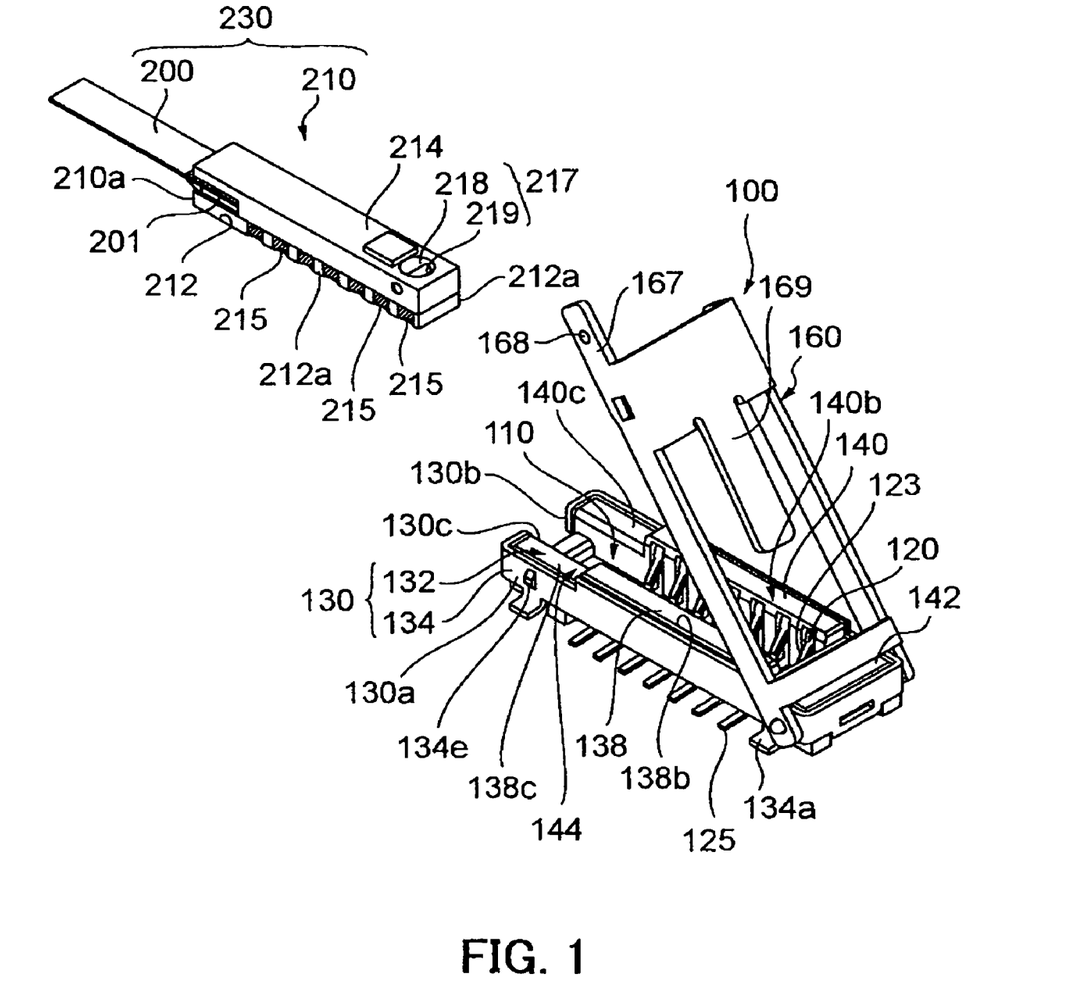
FIG. 1 shows the structure of the electronic-component connector having socket contacts as an example of the connection terminal according to one embodiment of the present invention.

FIG. 1 shows the structure of electronic-component connector 100 as a connection apparatus of an electric component having socket contact 120 as an example of the connection terminal according to one embodiment of the present invention. Here, as the electronic component that is connected to electronic-component connector 100, optical-waveguide module 230 to which optical waveguide 200 is attached will be used in the description. In this embodiment, the surface where electronic-component connector 100 is mounted on the substrate is the bottom surface, and the direction in which optical waveguide 200 is attached to module 210 is a direction toward the distal end of electronic-component connector 100.

In electronic-component connector (connection apparatus) 100 shown in FIG. 1, module 210 joined to optical waveguide 200 for guiding optical signals is detachably inserted from above. Socket contact (connection terminal) 120 is made to contact with electrodes (contact pads) 215 of module 210, and inserted module 210 is shielded and protected from electric fields or magnetic fields from the outside.

Optical-waveguide module 230 (electronic component) will first be described.

Module 210 of optical-waveguide module 230 receives the light of optical waveguide 200, converts the light to voltage, and outputs the voltage. The module is in a rectangular prism shape in this instance, and optical waveguide 200 is attached so as to extend in the longitudinal direction of module 210 from one end surface 210a.

Specifically, the length and width of module 210 correspond to the shape of open portion 110 in electronic-component connector 100, and is substantially equal to the length and width of the opening.

Module 210 is provided with: substrate 212 to which one end 201 of optical waveguide 200 is joined; an optical signal processing section (not shown) that is mounted on substrate 212 and performs optical signal processing through optical waveguide 200; and module case 214 for covering the optical signal processing section. Optical waveguide 200 is flexible, and is shaped as a film by using a cladding to cover two cores in the case of bi-directional optical transmission, and a single core in the case of unidirectional optical transmission.

In the case where optical waveguide 200 is bi-directional, the optical signal processing section is configured with light-receiving elements and light-emitting elements that receive and emit light through waveguides, optical processing components such as capacitors and amplifiers that process and amplify the signals from these elements. In the case where the optical waveguide is unidirectional, the optical signal processing section is configured with light-emitting elements or light-receiving elements such as photodiodes and optical processing components such as capacitors and amplifiers. In this arrangement, the optical signal processing section has an optical conversion function for outputting optical signals as voltages (electrical signals) when optical signals are inputted to the module. However, the optical signal processing section is not limited to this and may also have an optical conversion function for outputting electrical signals as optical signals when electrical signals are inputted to the module.

Figure 2A:
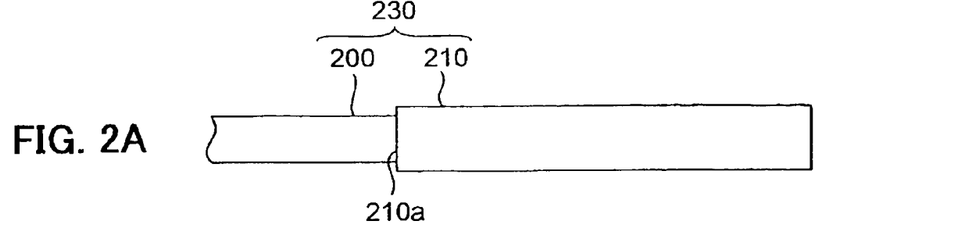
FIGS. 2A to 2C show the optical-waveguide module in FIG. 1.
Figure 2B:
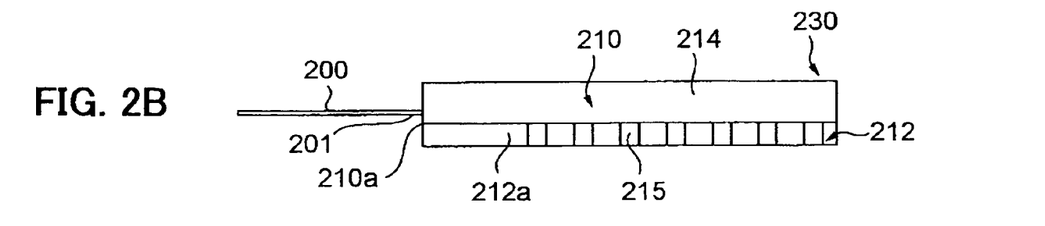
Figure 2C:
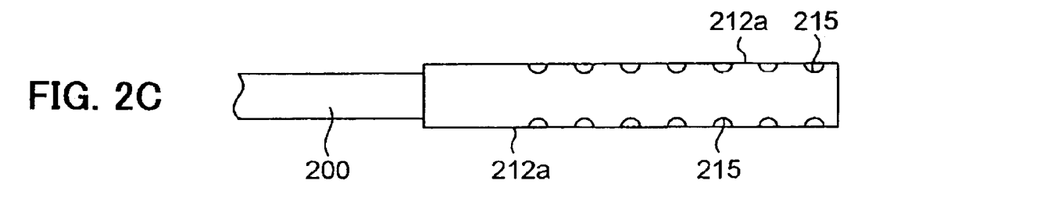

FIGS. 2A to 2C show optical-waveguide module 230 in FIG. 1, wherein FIG. 2A is a top view of optical-waveguide module 230, FIG. 2B is a side view, and FIG. 2C is a bottom view.

As shown in FIGS. 1 and 2, substrate 212 of module 210 is provided with a plurality of electrodes (contact pads) 215 adjacent to the mounting surface (not shown) With these electrodes, a voltage and an electrical current (electrical signal) converted by the optical signal processing section are outputted to two lateral surfaces 212a that extend in the extension direction of the optical waveguide.

Electrodes 215 are provided so as to be exposed on two lateral surfaces 212a on both sides. In this arrangement, when the mounting surface of substrate 212 is the back surface (top surface), the connection terminals are formed in concave shapes in concave portions formed in two lateral surfaces 212a so as to open to the front and the sides of module 210. The concave portions are recessed in semicircular shapes in both surfaces of substrate 212. Concave electrodes 215 may have any shape as long as the electrodes open to the side and in the direction of insertion (downward in this arrangement).

Figure 3:
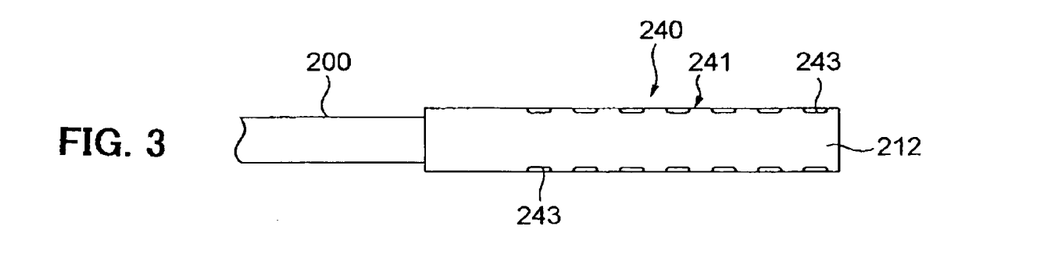
FIG. 3 is a bottom view of an optical-waveguide module having modified electrodes.

FIG. 3 is a bottom view of optical-waveguide module 240 (electronic component) having modified electrodes. In this module 241, substrate 212 has recessions that are rectangular when viewed from the bottom, and concave electrodes 243 are formed in the inner peripheral surfaces of these recessions. Concave electrodes 243 may also have horizontal cross-sections, or the electrodes may have circular arc shapes.

Concave electrodes 215 shown in FIGS. 1 and 2 are formed toward the front surface of module 210 and are oriented downward and orthogonal to the surface portion of film-shaped optical waveguide 200 in FIG. 1. When the electrodes come into electrical contact with electronic-component connector 100, the electrodes are connected in a direction that intersects with the direction of insertion by inserting the electrodes perpendicularly from the front surface (bottom surface).

Module case 214 is provided with detachment section 217 for detaching module 210 after module 210 has been connected to electronic-component connector 100. Indentation 218 is formed in the reverse side of module case 214, and shaft 219 is disposed across the inside of this indentation 218 to form this detachment section 217.

Module 210 thus configured is fitted into open portion 110 of electronic-component connector 100 that opens upward, and thereby electrodes 215 are connected to socket contacts 120 of electronic-component connector 100.

Figure 4:
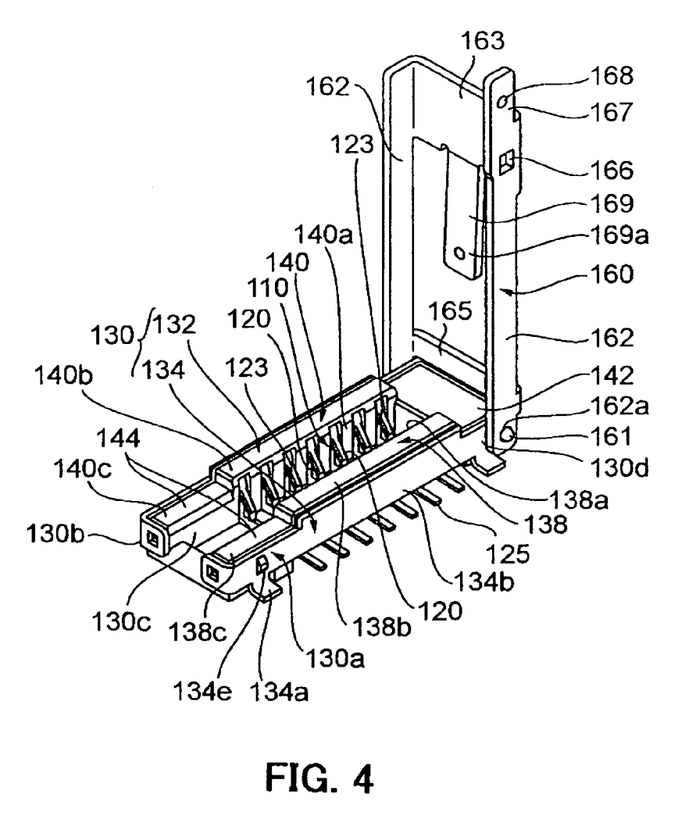
FIG. 4 is a top view of an electric-component connector having socket contacts as an example of the connection terminal according to one embodiment of the present invention.

FIG. 4 is a diagram of electronic-component connector 100 as viewed from above.

As shown in FIG. 4, electronic-component connector 100 has connector body 130 that has open portion 110 fitted by module 210 (see FIG. 1) being inserted into, and cover member 160 as a fixing portion for fixing module 210 (see FIG. 1) fitted by being inserted into open portion 110 of connector body 130, to connector body 130.

Connector body 130 has housing 132 that has open portion 110, and shield case 134 that is disposed on the periphery of housing 132 and that shields module 210 (see FIG. 1). that is fitted into open portion 110.

Figure 5:
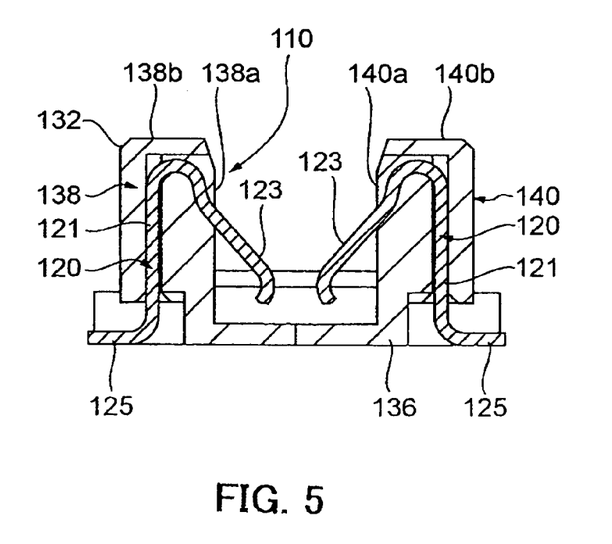
FIG. 5 is a sectional view of the region where the socket contacts are disposed in the housing of the electronic-component connector.
Figure 6:
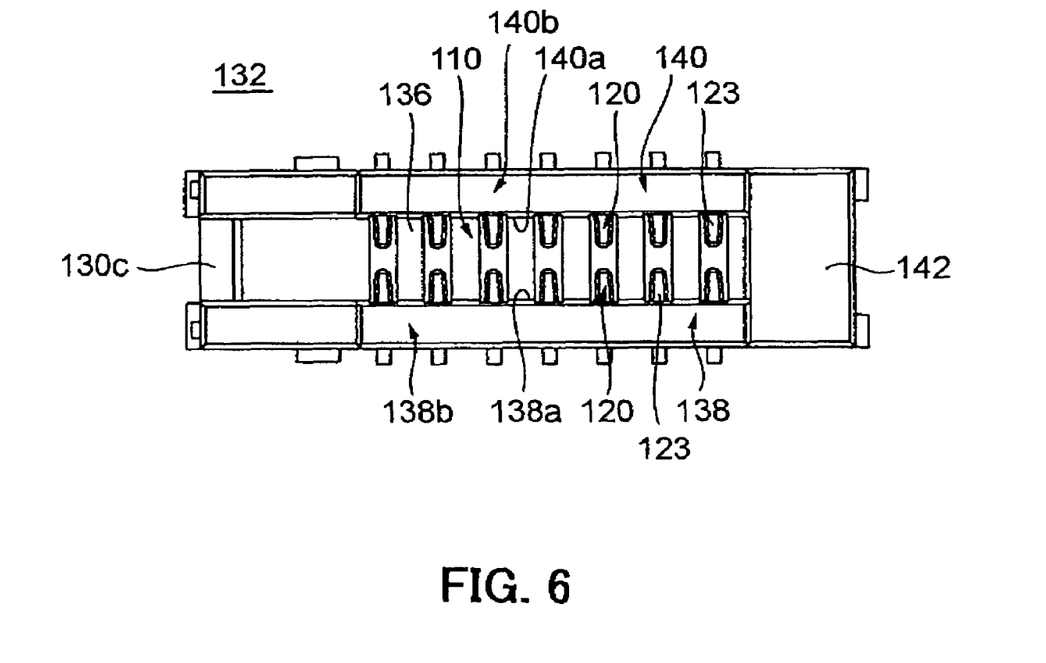
FIG. 6 is a plan view of the same housing.

FIG. 5 is a transverse cross-sectional view of the region where socket contacts 120 are disposed in housing 132, and FIG. 6 is a plan view of housing 132.

In housing 132 shown in FIGS. 5 and 6, a pair of side wall portions 138 and 140 that face each other across a predetermined gap and extend in the longitudinal direction, are provided on the top surface of rectangular plate-shaped bottom surface portion 136 (see FIG. 5) that faces the mounting substrate, and wall portion 142 (see FIG. 6) disposed on the proximal side and joined to the proximal end surfaces of both side wall portions 138 and 140, is provided at one end (proximal end in this case) of the pair of side wall portions 138 and 140.

Groove-shaped open portion 110 is formed opening upward by bottom surface portion 136, the pair of side wall portions 138 and 140, and proximal-end side wall portion 142 in housing 132.

In housing 132, when module 210 is fitted into open portion 110, socket contacts 120 for contacting electrodes 215 (see FIG. 1) of module 210 are provided to each of the opposing faces 138a and 140a of both side wall portions 138 and 140, that is, each of the inner wall surfaces that face open portion 110.

Socket contacts 120 are formed at positions that correspond to electrodes 215 of module 210 inserted into open portion 110, and socket contacts 120 come into contact with electrodes 215 when module 210 is placed in open portion 110.

Socket contacts 120 have: fixed parts 121 that are embedded in side wall portions 138 and 140 of housing 132 and fixed in housing 132; contact parts (contacts) 123 that protrude into open portion 110; and leads 125 that are exposed outside of housing 132.

As shown in FIGS. 5 and 6, contact parts 123 are disposed so as to protrude from the opposing inner peripheral surfaces (opposing faces 138a and 140a) of open portion 110, and protrude in parallel from the ends of fixed parts 121. Contact parts 123 cause concave electrodes 215 to slide and move to the distal end when module 210 (see FIG. 1) is inserted into open portion 110.

Figure 7A:
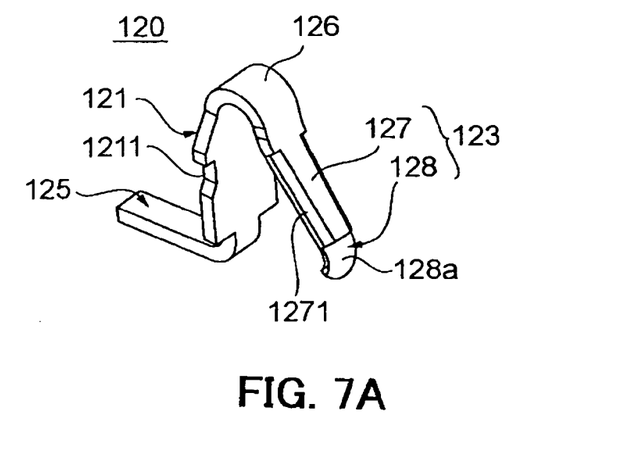
FIGS. 7A to 7D show a socket contact.
Figure 7B:
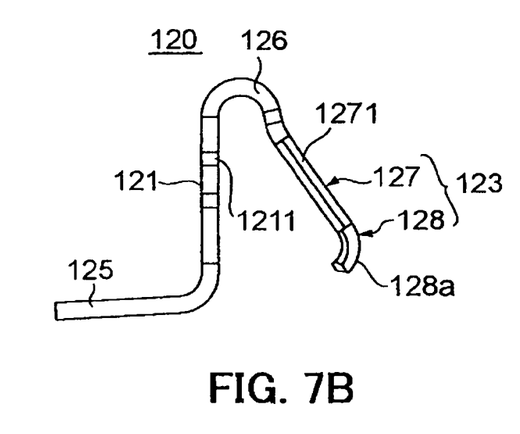
Figure 7C:
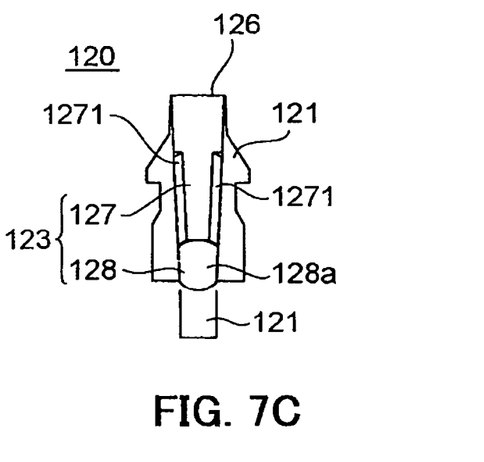
Figure 7D:
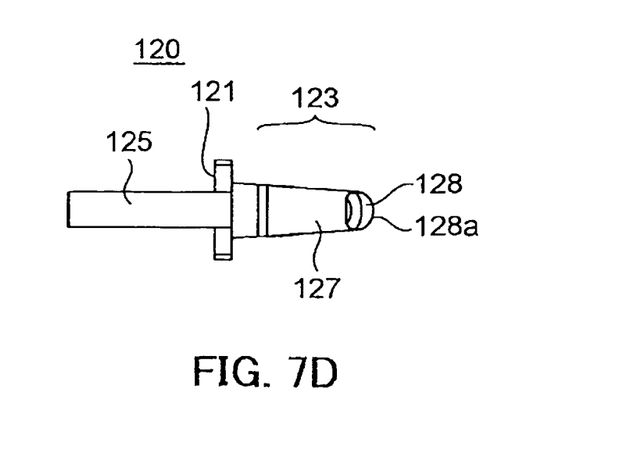

FIGS. 7A to 7D show socket contact 120, wherein FIG. 7A is a perspective view of socket contact 120, FIG. 7B is a side view of socket contact 120, FIG. 7C is a front view of socket contact 120 as viewed from the opening, and FIG. 7D is a bottom view of socket contact 120.

As shown in FIG. 7, socket contact 120 is formed by bending both ends of a dielectric long rectangular plate-shaped elastic member in opposite directions with respect to the surface of the plate-shaped elastic member. The center part is fixed part 121, and the both end portions are contact part 123 and lead 125, respectively.

Specifically, in socket contact 120, fixed part 121 is erected to be substantially perpendicular from one end of lead 125 that is disposed parallel to the bottom surface of electronic-component connector 100. The top end of fixed part 121 is bent (into a reverse U shape in this arrangement), and contact part 123 is formed by the region that extends downward at an angle from bent portion 126 in the opposite direction of the lead.

Fixed part 121 is formed to be wider than lead 125 and contact part 123 in order to ensure the strength of socket contact 120, and fixed part 121 supports contact part 123.

Interlocking parts 1211 that engage with side wall portion 138 or 140 inside side wall portion 138 or 140 are formed on both sides of fixed part 121.

Interlocking parts 1211 are embedded in side wall portions 138 and 140 (see FIG. 5) and engage with a region in side wall portions 138 and 140, fixing socket contact 120 in side wall portions 138 and 140.

Contact part 123 has a function of a leaf spring (circular arc or linear spring) by bent portion 126 between contact part 123 and fixed part 121, and is urged away from fixed part 121 when pushed towards fixed part 121. Contact part 123 may be configured in any manner as long as contact part 123 is urged away from fixed part 121 when pushed towards fixed part 121, that is, as long as contact part 123 is urged towards the connected component so as to push on and come into contact with corresponding electrode 215. For example, a metal plate-shaped member may be bent a plurality of times to form contact part 123. All contact parts 123 protrude into open portion 110 from opposing faces 138a and 140a of sidewall portions 138 and 140 (see FIGS. 5 and 6).

Contact part 123 is inclined away from fixed part 121 towards the distal end, and has contact trunk 127 for guiding one of electrodes 215 of connected module 210 toward the distal end, and contact point 128 that is provided at the distal end of contact trunk 127 and that contacts electrode 215 of module 210.

Contact part 123, which has contact trunk 127 and contact point 128, has a shape wherein both sides gradually draw from the proximal end side (the side near fixed part 121) to the distal end side, and the shape narrows towards the bottom. In contact point 128, the width on the side of the proximal end portion—the proximal end portion of contact trunk 127—is approximately equal to the length that can be inserted into concave electrode 215 of module 210 when electrode 215 is set in place.

Both sides of contact trunk 127 are provided with tapers 1271 such as C-shaped surfaces whose surfaces (surfaces in contact with module 210) have a gradually decreasing width, and the front surface is narrower than the back surface. Tapers 1271 of contact trunk 127 may be formed by being pressed.

Contact point 128 is bent towards fixed part 121 at a predetermined position that extends continuously to the distal end from the proximal end connected to contact trunk 127. Contact point 128 is formed in a circular arc shape so as to protrude towards the front surface in the width direction, and is also formed so that front surface (contact surface) 128a is hemispherical. The front surface—the contact surface of contact point 128—is shaped by being pressed. In other words, contact point 128 is formed into a convex shape that protrudes towards the front surface. Belt-shaped contact part 123 that intersects with the longitudinal direction has a circular arc cross-sectional shape that protrudes towards the front surface.

Contact point 128 in the present embodiment has hemispherical surface 128a, but is not limited to this. For example, contact part 123 may be pressed (flattened) and the two lateral portions are pressed from the front surface, either alone or together with the proximal and distal ends, so that contact point 128 is formed into a convex shape that protrudes towards the front surface, or a circular arc shape in which the cross-sectional shape that intersects with the longitudinal direction of belt-shaped contact part 123 protrudes towards the front surface.

Leads 125 extend to the outside of connector body 130 through holes formed in the bottom surfaces of side wall portions 138 and 140 of housing 132. Leads 125 extend substantially parallel to the bottom surface of connector body 130, that is, to bottom surface portion 136. Since socket contacts 120 thus formed are provided to side wall portions 138 and 140 of housing 132, contact parts 123 come into contact with electrodes 215 of substrate 212 in module 210 when module 210 is inserted into open portion 110 of electronic-component connector 100 from above.

Leads 125 are connected to the top of the substrate when disposed on the substrate to which electronic-component connector 100 is mounted. In other words, signals from optical-waveguide module 230 are transmitted from electrodes 215 to contact points 128 of socket contacts 120, and pass through contact points 128, contact trunks 127 and fixed parts 121 to be transmitted by leads 125 to the circuits of the substrate on which electronic-component connector 100 is mounted. Signals are also transmitted in the opposite direction from the substrate.

In side wall portions 138 and 140 of housing 132, top surfaces 138b and 140b of the regions provided with socket contacts 120 are the highest parts of side wall portions 138 and 140. This is because recessions 144 are formed in the other upper surface portions (the upper surface portions at the distal ends) 138c and 140c, as shown in FIGS. 1 and 4. Top surfaces 138b and 140b of the regions provided with socket contacts 120 are disposed between upper surface portions 138c and 140c at the distal ends of side wall portions 138 and 140 and the top surface of proximal-end side wall portion 142.

The upper surface of proximal-end side wall portion 142 is substantially in the same plane as upper surface portions 138c and 140c at the distal ends of side wall portions 138 and 140. With proximal-end side wall portion 142, the proximal end side of connector body 130 is provided with a recessed shape in the same manner as recessions 144 formed in the distal end side.

Thus, socket contacts 120 are not provided to proximal-end side wall portion 142 or side wall portions 138 and 140 having recessions 144 in housing 132. Therefore, there is no need to ensure the height (of the fixed parts 121 in this arrangement)

or the strength needed when socket contacts 120 are provided to housing 132, so that the height level can be lowered correspondingly.

The height level of the other upper surface portions in which recessed portions 144 are formed is at substantially the same height level as the plane of the upper surface (back surface) of module 210 (see FIGS. 1 and 2) when module 210 (see FIGS. 1 and 2) is inserted and positioned in open portion 110. In other words, module 210 fitted into open portion 110 is lower than the height at which socket contacts 120 are provided in side wall portions 138 and 140.

In housing 132 as shown in FIGS. 1 and 4, lead-out path 130c that extends in the longitudinal direction from one end surface (distal end surface) 130b of connector body 130 is formed to guide optical waveguide 200 (see FIGS. 1 and 2) of fitted module 210 (see FIGS. 1 and 2) at one of the ends (distal end) 130a that are separated in the longitudinal direction of connector body 130, that is, between side wall portions 138 and 140 at one end. In this configuration, when module 210 (see FIGS. 1 and 2) is fitted into open portion 110, optical waveguide 200 attached to module 210 (see FIG. 1) is not retained by electronic-component connector 100, and is guided to the outside of electronic-component connector 100.

The external peripheral portion of housing 132, except lead-out path 130c, is covered by rectangular shield case 134 (see FIGS. 1 and 4), which is shaped as a rectangular frame. Shield case 134 extends parallel to bottom surface portion 136 of connector body 130 from the lower edge, and is provided with leads 134a that are attached to the mounting substrate.

Module 210 (see FIG. 1) fitted into open portion 110 of connector body 130 thus configured is covered by cover member 160 from the opening direction of open portion 110, that is, from above connector body 130. Module 210 is thereby fixed in a state of electrical connection to connector body 130.

Cover member 160 has a pair of arm portions 162 in which one end 162a is attached so as to be able to rotate about shaft portion 161 that is oriented perpendicular to the longitudinal direction on the two side portions of proximal end 130d of connector body 130, installation plate portion 163 that is disposed on recessed portions 144 at the distal end of the connector body and installed between the pair of arm portions 162, and reinforcing installation plate portion 165 that is disposed on proximal-end side wall portion 142 of connector body 130.

Arm portions 162 are shaped as plates, and rotating the arm portions about end portions 162a brings the arm portions to positions covering the side surfaces of connector body 130—the outer surfaces of side wall cover portions 134b—, when installation plate portion 163 is disposed in recessions 144.

One of arm portions 162 is provided with latch hole 166 that engages with interlocking part 134e formed in one of side wall cover portions 134b and fixes cover member 160 to connector body 130 when cover member 160 is closed to a position covering the outer surfaces of side wall cover portions 134b. Interlocking part 134e and latch hole 166 are configured with protuberance 134e that protrudes from the outer surface of the distal end portion of side wall cover portion 134b, and engaging hole 166 formed in arm portions 162 and used to accept and engage protuberance 134e.

Operation member 167 (see FIGS. 1 and 4) for facilitating the opening and closing of cover member 160 is provided to arm portion 162. Through-hole 168 running parallel to shaft portion 161 of cover member 160 is formed in operation member 167, and cover member 160 can be opened and closed over connector body 130 by inserting a tool into through-hole 168 and allowing cover member 160 to rotate.

When installation plate portion 163 is placed in recessions 144 (see FIG. 4), module 210 (see FIG. 1) is fitted into open portion 110, and an electrical connection is established with connector body 130, module 210 (see FIG. 1) is prevented from moving towards the front surface, that is, upward from connector body 130.

Installation plate portion 163 is also provided with pushing member 169 for pushing module 210 (see FIG. 1) fitted into open portion 110 downward (towards the socket contacts) from the upper surface (back surface).

Pushing member 169 has a flexible plate shape such as a leaf spring and extends downward at an incline from the edge of the proximal end of installation plate portion 163 towards the proximal end of cover member 160. Free-end portion 169a thereof is disposed so as to be positioned substantially in the middle of the module fitted into open portion 110.

The following is a description of the operation of connecting optical-waveguide module 230 with the electronic-component connector having socket contacts 120. Cover member 160 fixes and retains optical-waveguide module 230, which is electrically connected to electronic-component connector 100. Therefore, optical-wave guide module 230 will be described together with the operation of connecting optical-waveguide module 230 with housing 132 having open portion 110.

Figure 8A:
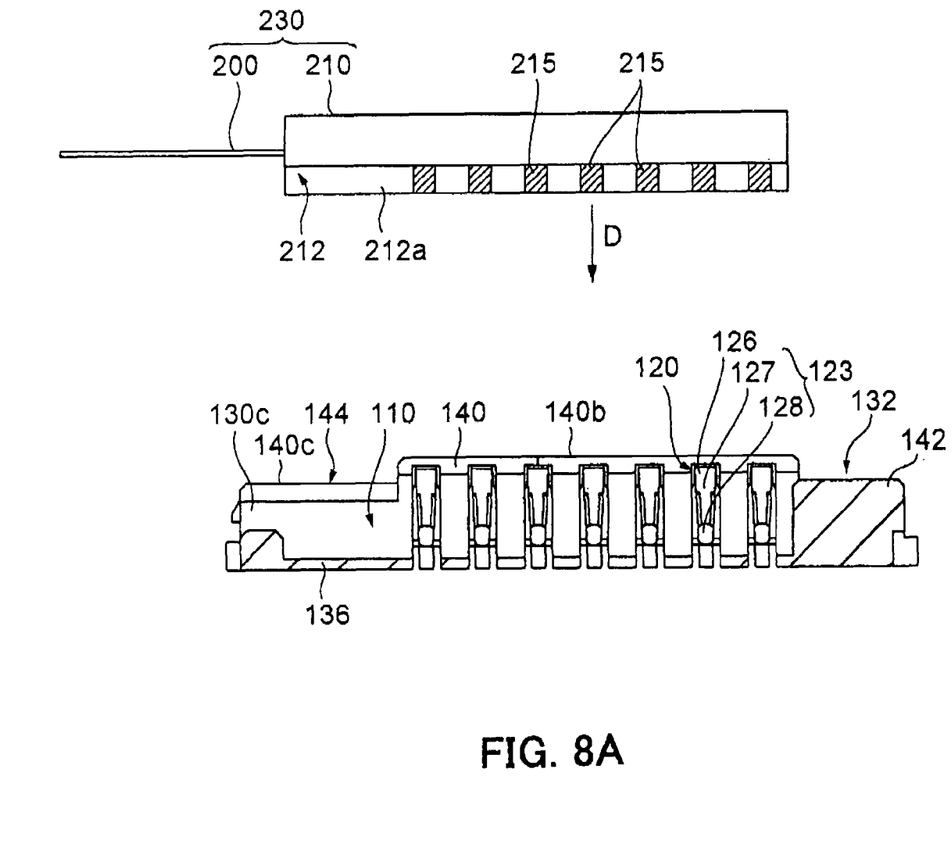
FIGS. 8A and 8B illustrate the connection between an electrode of the optical-waveguide module and a connection terminal of the housing.
Figure 8B:
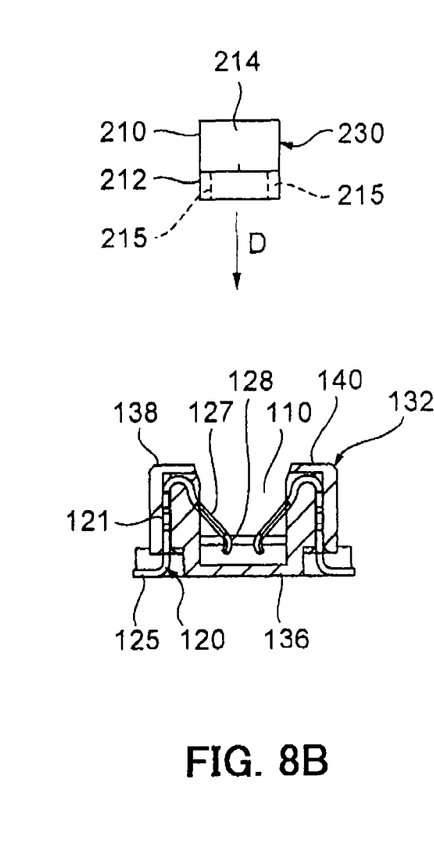

FIGS. 8A and 8B illustrate the connection of electrodes 215 of optical-waveguide module 230 with socket contacts 120 of housing 132, wherein FIG. 8A is a longitudinal cross-sectional view of housing 132, showing the interior of open portion 110 into which optical-waveguide module 230 is inserted, and FIG. 8B is a diagram of optical-waveguide module 230 and housing 132 as seen from the proximal-end side. FIG. 8B is a cross-sectional view of housing.

As shown in FIG. 8, in housing 132, optical-waveguide module 230 is inserted from above into upward-exposed groove-shaped open portion 110. The insertion is made from the front surface of module 210 in the direction of the arrow D, that is, from the side near substrate 212. Contact parts 123 of socket contacts 120 are provided in opposing faces 138a and 140a configuring open portion 110 so as to protrude towards each other, and substrate 212 of module 210 therefore comes into contact with contact parts 123 from above.

Specifically, in module 210, the two side edges of the surface (front surface) facing the open portion are brought into contact at the proximal-end sides of contact trunks 127. Furthermore, inserting module 210 causes substrate 212 of module 210 to be successively lowered and slid along the distal-end sides of contact trunks 127. This sliding causes contact parts 123 to be elastically deformed and moved towards fixed parts 121, that is, towards the opposing surfaces from which contact parts 123 protrude.

At this time, since contact parts 123 have shapes that narrow towards contact points 128 at the distal ends, contact parts 123 are easily fitted into the concave portions of electrodes 215 that form the concave shapes in module 210 brought into contact from above.

Figure 9A:
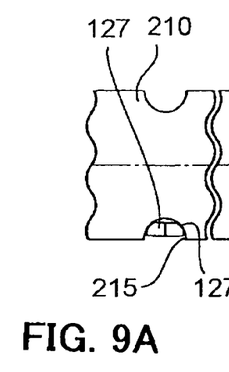
FIGS. 9A and 9B are a cross-sectional plan view showing the operation of connecting the socket contacts and the electrodes.
Figure 9B:
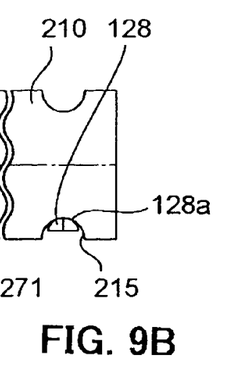

FIGS. 9A and 9B are a cross-sectional plan view that shows the operation of connecting socket contacts 120 with electrodes 215, and that also shows all the portions of contact parts 123 inserted into the concave portions of electrodes 215 in module 210. FIG. 9A shows contact trunk 127 inserted into concave electrode 215, and FIG. 9B shows contact point 128 inserted into concave electrode 215.

As shown in FIG. 9A, contact trunks 127 narrow in width in the direction in which module 210 is inserted, and tapers 1271 are oriented towards the front surfaces so that the reverse surfaces are wider than the front contact surfaces. The front surfaces of contact trunks 127 are therefore narrower than the openings of concave electrodes 215.

These tapers 1271 allow contact trunks 127 to be easily guided and inserted into the concave portions of electrodes 215 in module 210 when module 210 slides while contact parts 123 are pushed upward at the surface from the proximal-end side to the distal-end side.

As shown in FIG. 9B, contact points 128 narrow in the direction in which module 210 is inserted, and front contact surfaces 128a are formed into hemispherical shapes. Contact points 128 are therefore smaller in width than the openings of concave electrodes 215. Contact points 128 are therefore easily inserted into concave electrodes 215.

Figure 10A:
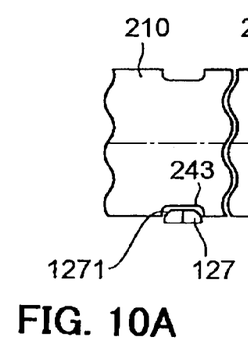
FIGS. 10A and 10B are a cross-sectional plan view showing the operation of connecting the socket contacts and the electrodes in a case of connecting the optical-waveguide module shown in FIG. 3.
Figure 10B:
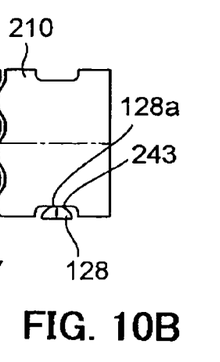

FIGS. 10A and 10B are a cross-sectional plan view showing the operation of connecting socket contacts 120 with electrodes 243 for the case where module 241 is connected in optical-waveguide module 240 shown in FIG. 3. FIGS. 10A and 10B show all the portions of contact parts 123 inserted into the concave shapes of electrodes 243 in module 210, similar to FIGS. 9A and 9B.

As shown in FIG. 10, all the portions of contact parts 123 are similarly inserted even when substrate 212 is recessed in rectangular shapes as seen from the bottom, and concave electrodes 243 in module 241 are formed in the inner surfaces of these recessions.

Thus, contact parts 123 narrow towards the distal ends, and tapers 1271 are formed in contact trunks 127. Therefore, inserting module 210 further into open portion 110 maintains strength and causes the front contact surfaces of contact trunks 127 to fit into the concave portions of concave electrodes 215, even in cases in which contact parts 123 do not fit into the narrow concave portions of electrodes 215 at the proximal-end sides of contact trunks 127, that is, at the upper-end side of housing 132.

Since front contact surfaces 128a where contact points 128 come into contact with concave electrodes 215 are hemispherical, contact points 128 are also easily fitted into the concave portions of concave electrodes 215.

When contact parts 123 are thus fitted into the concave portions of concave electrodes 215, contact parts 123 slide into the concave shapes of electrodes 215, and electrodes 215 are guided to contact points 128 at the distal ends.

Specifically, socket contacts 120 are shaped so that contact trunks 127 and contact points 128 protrude from side wall portions 138 and 140 towards open portion 110 and narrow towards the distal ends, and the side surfaces thereof gradually draw together. In addition, tapers 1271 are formed in contact trunks 127, and surfaces 128a of contact points 128 are hemispherical. Strength can thereby be maintained, electrodes 215 can be easily guided onto contact points 128 even for electrodes with small widths such as electrodes 215 having small concave openings, and electrodes 215 and contact points 128 can be stably and reliably connected in a one-point contact.

Figure 11:
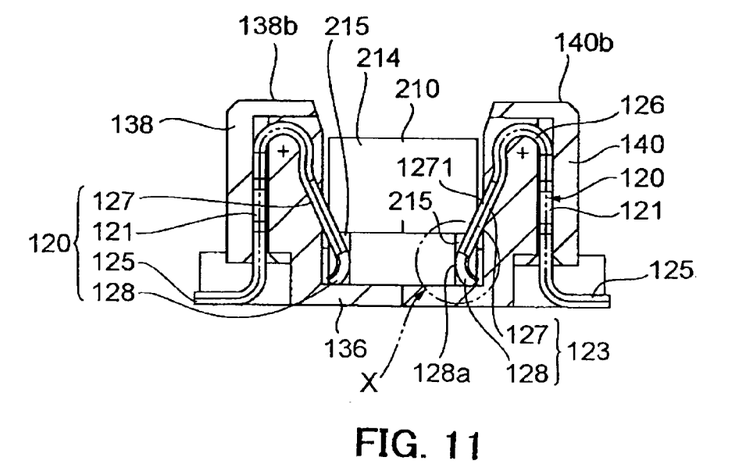
FIG. 11 is a cross-sectional view showing the state where the module is fitted into the housing.

FIG. 11 is a cross-sectional view showing the state in which module 210 fits into housing 132.

As shown in FIG. 11, concave electrodes 215 formed in the side surfaces of substrate 212 in module 210 slide along contact trunks 127 of socket contacts 120 in housing 132 to be guided onto contact points 128 at the distal ends. As shown by portion X in FIG. 11, electrodes 215 of substrate 212 are in a stable one-point contact with hemispherical surfaces 128a of corresponding contact points 128.

At this time, contact parts 123 having contact trunks 127 and contact points 128 protrude towards the inside of open portion 110 from side wall portions 138 and 140 of groove-shaped open portion 110. Contact parts 123 are also inclined downwards and are capable of being elastically deformed.

Therefore, when module 210 is inserted into open portion 110, contact parts 123 are elastically deformed at the distal-end sides and are urged into concave electrodes 215 while being fitted into the concave portions of electrodes 215, and electrodes 215 are guided into contact with contact points 128. At this time, contact points 128 of contact parts 123 are pressed against electrodes 215 by this urging force.

By this means, electrodes 215 of the module and contact parts 123 of socket contacts 120 are reliably in contact. Module 210 is thereby fitted into open portion 110.

Module 210 is fitted into open portion 110 of connector body 130, after cover member 160 is closed, installation plate portion 163 is placed in recessions 144, and protuberance 134e of shield case 134 is fitted into interlocking hole 166 of cover member 160. Installation plate portion 163 is thereby fixed onto connector body 130.

When cover member 160 is closed, pushing member 169 pushes on module 210 from the substantially middle portion of the back surface. This pressing force is transmitted to all of electrodes 215 of module 210 and socket contacts 120 (see FIG. 6), enabling firmer contact between these contacting portions.

Shock such as vibration imparted to the mounting substrate on which electronic-component connector 100 is mounted are therefore prevented from causing misalignment, disconnection, or fretting at the position of contact with module 210. Specifically, in the structure in which electronic-component connector 100 of the present embodiment is connected with optical-waveguide module 210, an electrical signal can be transmitted smoothly without module 210 becoming misaligned with respect to electronic-component connector 100.

According to the present invention as described above, stable one-point contact can be achieved between the electrodes and the contact positions, and the connecting operation can be performed smoothly even in cases of small contact pads or other electrodes in electric contact.

Also, according to this configuration, optical-waveguide module 230 slides from the proximal-end sides to the distal-end sides, belt-shaped contact parts 123 are brought into pressure contact with electrodes 215 and 243 of module 210 at contact points 128 at the distal ends, and the contact parts narrow towards the distal ends. Contact points 128 in contact with electrodes 215 and 243 of module 210 at the distal ends can therefore be made smaller in width than the electrodes while retaining sufficient strength, and stable contact can be achieved.

Module 210 slides from the proximal-end sides of contact parts 123 to the distal-end sides, and electrodes 215 and 243 are brought into pressure contact with contact points 128. Therefore, contact parts 123 can be brought into pressure contact with electrodes 215 and 243 merely by sliding module 210 from the proximal-end sides, and the connecting operation can be performed smoothly.

Since the surfaces of contact points 128 pressed against electrodes 215 and 243 are formed into convex shapes protruding towards the front surface by being flattened from the front surface, contact points 128 can be brought into one-point pressure contact with electrodes 215 and 243, and a stable connection can be achieved regardless of the size of electrodes 215 and 243.

Furthermore, the front surfaces of contact trunks 127 where electrodes 215 and 243 come into contact are narrower than the reverse surfaces. Therefore, when contact trunks 127 come into contact with concave electrodes 215 and 243 of module 210, contact trunks 127 are fit easily into electrodes 215 and 243 due to tapers 1271 of the contact trunks, and electrodes 215 and 243 can be easily guided onto contact points 128 at the distal ends when electrodes 215 and 243 move from the proximal-end sides of contact parts 123 to the distal-end sides.

The two lateral portions of contact trunks 127 are provided with tapers 1271 that draw together towards the front surface, and the surfaces of contact points 128 pressed against electrodes 215 and 243 are flattened from the front surfaces to be formed into convex shapes protruding towards the front surfaces. Therefore, contact points 128 can be brought into one-point pressure contact with electrodes 215 and 243, stable connection can be achieved, and the connecting operation can be performed smoothly regardless of the size of the electrodes against which contact points 128 are pressed. For example, when contact trunks 127 come into contact with concave electrodes 215 and 243 of an electronic component, contact trunks 127 are fit easily into electrodes 215 and 243 due to tapers 1271 of the contact trunks, and electrodes 215 and 243 can be easily guided onto pressure-contact positions with contact points 128 when electrodes 215 and 243 move from the proximal-end sides of contact parts 123 to the distal-end sides.

Flattening the lateral portions of contact trunks 127 from the front surfaces to form tapers 1271 allow contact points 128 having a one-point contact to be easily formed even with small electrodes 215 and 243, in the case that electrodes 215 and 243 of the connecting component are small. The state of contact between electrodes 215 and 243 and contact parts 123 can be stabilized.

In the present embodiment, a module connected to electronic-component connector 100 was described as an optical-waveguide module, but the present invention is not limited to this. Any type of module may be used as long as the electronic component is provided with connection terminals for contacting contact pads or other such electrodes. These types of modules include a module (electronic component) that does not have an optical waveguide but converts optical signals into electrical signals or a module (electronic component) for processing signals from a transmission medium for transmitting electric signals other than optical waveguides, such as electrical wires, cables and flexible cables, or any other module for processing signals via a transmission member for transmitting electrical signals.

What is claimed is:

1. A connection terminal that is provided to a connection apparatus connected to an electronic component, and that comes into contact at a distal end with an electrode of the electronic component in a direction that intersects with a connecting direction of the electronic component, the connection terminal comprising:

a contact part that is formed into a belt shape, disposed to permit insertion of the electronic component by the electronic component sliding from a proximal end to the distal end, with the electrode brought into pressure contact at a contact point at the distal end to establish electrical contact with the electronic component to the connection apparatus, wherein the contact part narrows towards the distal end to form a taper and is configured to accept insertion of the electronic component in a direction in which the contact part narrows in width in the direction of insertion of the electronic component, and when, in the case of the electronic component having concave electrodes, the contact part comes into contact with one of the electrodes, a portion of the contact part fits easily into the electrode due to the taper, so as to guide the electrode into contact with the contact with the contact part when the electrode slides from the proximal end to the distal end.

2. The connection terminal according to claim 1, wherein a surface of the contact point brought into pressure contact with the electrode is flattened from a front surface, and thereby the surface is formed into a convex shape protruding towards the front surface.

3. The connection terminal according to claim 1, wherein the contact part comprises a contact trunk provided with a contact point at the distal end, and lateral portions of the contact trunk are provided with the tapers that draw together towards the front surface.

4. The connection terminal according to claim 1, wherein:

the contact part comprises a contact trunk provided with a contact point at the distal end;

the lateral portions of the contact trunk are provided with tapers that draw together towards the front surface; and the surface of the contact point brought into pressure contact with the electrode is flattened from the front surface, and thereby the surface is formed into a convex shape protruding towards the front surface.

5. The connection terminal according to claim 1, wherein the contact point has a circular arc cross-sectional shape that protrudes towards the front surface and intersects with the longitudinal direction of the belt-shaped contact part.

6. The connection terminal according to claim 2, wherein the surface of the contact point is formed into a semispherical shape.

7. The connection terminal according to claim 3, wherein the tapers are formed by flattening the lateral portions of the contact trunk from the front surface.

8. The connection apparatus of the electronic component, comprising the connection terminal according to claim 1.

9. The connection apparatus according to claim 8, further comprising:

a connector body having an electronic component receiving portion;

a cover member configured so that, in a closed position, the cover member fixes and retains the electronic component in the component receiving portion of the connector body; and a protuberance and interlocking hole on the cover member and the body capable of securing the cover member closed to said closed position.

10. The connection apparatus according to claim 9, further comprising cover member including a pushing member for pushing the electronic component downward into the electronic component receiving portion with the cover member in the closed position.

11. A connector for an electronic component capable of providing an optical interface, the connector comprising:

a connector body having an electronic component receiving portion;

at least one contact part that comes into contact at a distal end with an electrode of the electronic component in a direction that intersects with a connecting direction of the electronic component, the contact part formed into a belt shape, disposed to permit insertion of the electronic component into the electronic component receiving portion by the electronic component sliding from a proximal end to the distal end of the contact part, with the electrode brought into pressure contact at a contact point at the distal end of the contact part to establish electrical contact with the electronic component to the connection apparatus, wherein the contact part narrows towards the distal end;

a lead-out path extending in a longitudinal direction from one end surface of the connector body formed to guide an optical waveguide extending from the electronic component;

a cover member configured so that, in a closed position, the cover member fixes and retains the electronic component in the component receiving portion with the lead-out path extending from said one end surface of the connector body; and a protuberance and interlocking hole on the cover member and the body capable of securing the cover member closed to said closed position.

12. The connector according to claim 11, wherein:

the contact part narrows towards the distal end to form a taper and configured to accept insertion of the electronic component in a direction in which the contact part narrows in width in the direction of insertion of the electronic component, and wherein when, in the case of the electronic component having concave electrodes, the contact part comes into contact with one of the electrodes, a portion of the contact part fits easily into the electrode due to the taper, so as to guide the electrode into contact with the contact with the contact part when the electrode slides from the proximal end to the distal end.

13. The connector according to claim 12, wherein a surface of the contact point brought into pressure contact with the electrode is flattened from a front surface, and thereby the surface is formed into a convex shape protruding towards the front surface.

14. The connector according to claim 13, wherein the surface of the contact point is formed into a semispherical shape.

15. The connector according to claim 14, wherein the tapers are formed by flattening the lateral portions of the contact trunk from the front surface.

16. The connector according to claim 12, wherein the contact part comprises a contact trunk provided with a contact point at the distal end, and lateral portions of the contact trunk are provided with the tapers that draw together towards the front surface.

17. The connector according to claim 12, wherein:

the contact part comprises a contact trunk provided with a contact point at the distal end;

the lateral portions of the contact trunk are provided with tapers that draw together towards the front surface; and the surface of the contact point brought into pressure contact with the electrode is flattened from the front surface, and thereby the surface is formed into a convex shape protruding towards the front surface.

18. The connector according to claim 12, wherein the contact point has a circular arc cross-sectional shape that protrudes towards the front surface and intersects with the longitudinal direction of the belt-shaped contact part.

19. The connector according to claim 11, further comprising cover member including a pushing member for pushing the electronic component downward into the electronic component receiving portion with the cover member in the closed position.

* * * * *